US010220791B2

United States Patent
Sotome

(10) Patent No.: US 10,220,791 B2
(45) Date of Patent: Mar. 5, 2019

(54) COMPONENT MOUNTING STRUCTURE

(71) Applicant: PIOLAX, INC., Yokohama-shi (JP)

(72) Inventor: Yukihiro Sotome, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 23 days.

(21) Appl. No.: 15/517,493

(22) PCT Filed: Oct. 5, 2015

(86) PCT No.: PCT/JP2015/078216
§ 371 (c)(1),
(2) Date: Apr. 6, 2017

(87) PCT Pub. No.: WO2016/056513
PCT Pub. Date: Apr. 14, 2016

(65) Prior Publication Data
US 2017/0305355 A1 Oct. 26, 2017

(30) Foreign Application Priority Data

Oct. 7, 2014 (JP) .................................. 2014-206678

(51) Int. Cl.
*B60R 7/10* (2006.01)
*A47G 29/00* (2006.01)
*A47G 25/06* (2006.01)

(52) U.S. Cl.
CPC ............ *B60R 7/10* (2013.01); *A47G 25/0635* (2013.01); *A47G 29/00* (2013.01)

(58) Field of Classification Search
CPC ......... B60R 7/08; B60R 7/10; Y10T 403/583; Y10T 403/58; Y10T 403/51;
(Continued)

(56) References Cited

U.S. PATENT DOCUMENTS 779,478 A * 1/1905 Hope ....................... A44B 5/00
24/90.5
3,106,759 A * 10/1963 Kytta ...................... F16B 2/241
24/453
(Continued)

FOREIGN PATENT DOCUMENTS

| JP | H 04-74150 U | 6/1992 |
|----|--------------|--------|
| JP | 2006-088888 A | 4/2006 |
| JP | 2009-269592 A | 11/2009 |

OTHER PUBLICATIONS

International Search Report (ISR) (PCT Form PCT/ISA/210), in PCT/JP2015/078216, dated Nov. 2, 2015.

*Primary Examiner* — Scott McNurlen
(74) *Attorney, Agent, or Firm* — McGinn I.P. Law Group, PLLC.

(57) ABSTRACT

One embodiment provides a mounting structure including a hook member to be mounted on a mount member, and a mounting member. A base part of the hook member protrudes from the front side of the mount member. In the mounted state, a locking part of the hook member locks with a back rim of a mounting hole. An operation part of the mounting member is operated during the mounting on the mount member. An engaging part of the mounting member can engage with the locking part at the back side of the mount member. The mounted state is achieved by sliding, via an operation applied to the operation part, the mounting member substantially parallel to a front surface or a back surface of the mounting hole, such that the engaging part engages with the locking part.

10 Claims, 13 Drawing Sheets

(58) Field of Classification Search
CPC ......... Y10T 24/44026; Y10T 24/45105; Y10T 24/309; Y10T 24/42; F16B 13/063; F16B 13/083; A47G 25/0635
USPC ................... 224/311, 313; 24/458, 453, 297, 24/606–607; 403/315–317, 247, 403/289–290; 411/45–48
See application file for complete search history.

(56) References Cited

U.S. PATENT DOCUMENTS

| | | | | |
|---|---|---|---|---|
| 5,560,575 | A * | 10/1996 | Krysiak | B60R 7/10 |
| | | | | 248/222.12 |
| 6,324,732 | B1 * | 12/2001 | Arisaka | B60J 3/023 |
| | | | | 24/453 |
| 6,406,242 | B1 * | 6/2002 | Gordon | E05B 79/06 |
| | | | | 24/297 |
| 7,216,404 | B1 * | 5/2007 | Doyle | A45F 5/02 |
| | | | | 206/286 |
| 9,695,975 | B2 * | 7/2017 | Ogawa | F16M 13/022 |
| 2009/0000085 | A1 * | 1/2009 | Okada | F16B 19/1081 |
| | | | | 24/453 |
| 2009/0250579 | A1 | 10/2009 | Nishida et al. | |

* cited by examiner

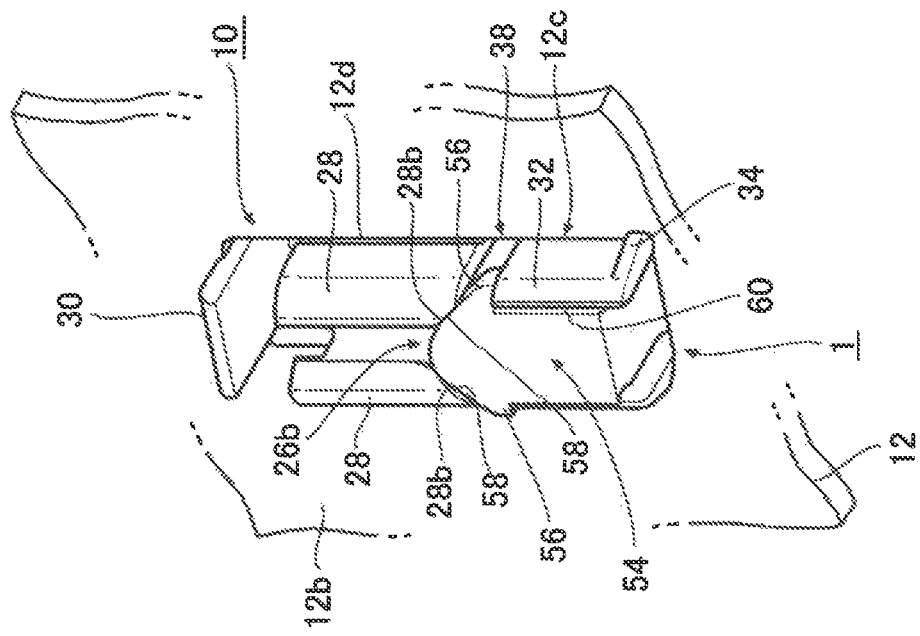
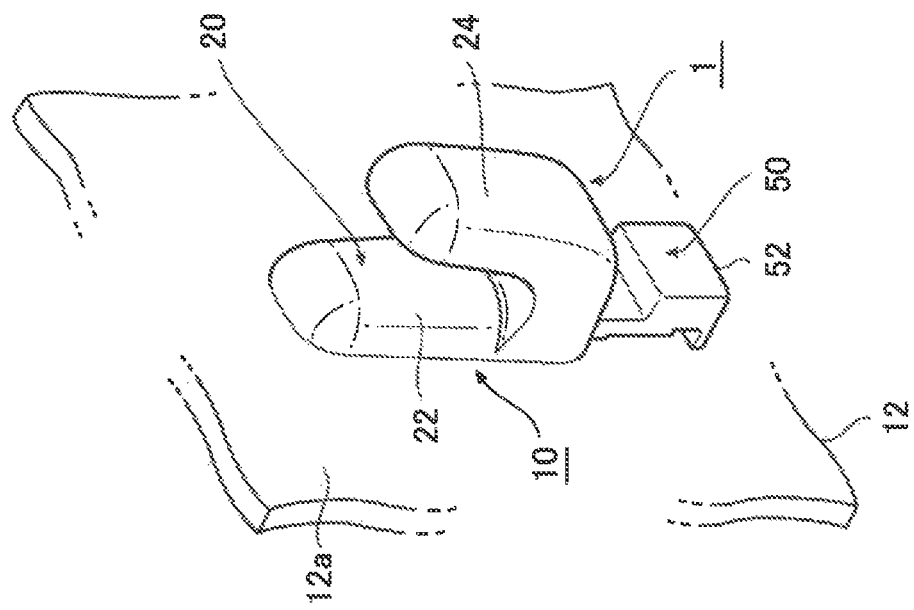
FIG. 3A
FIG. 3B

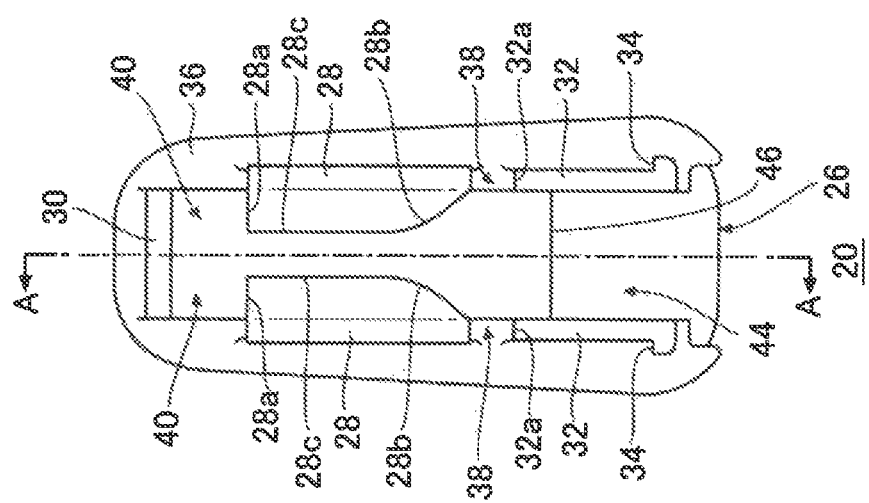
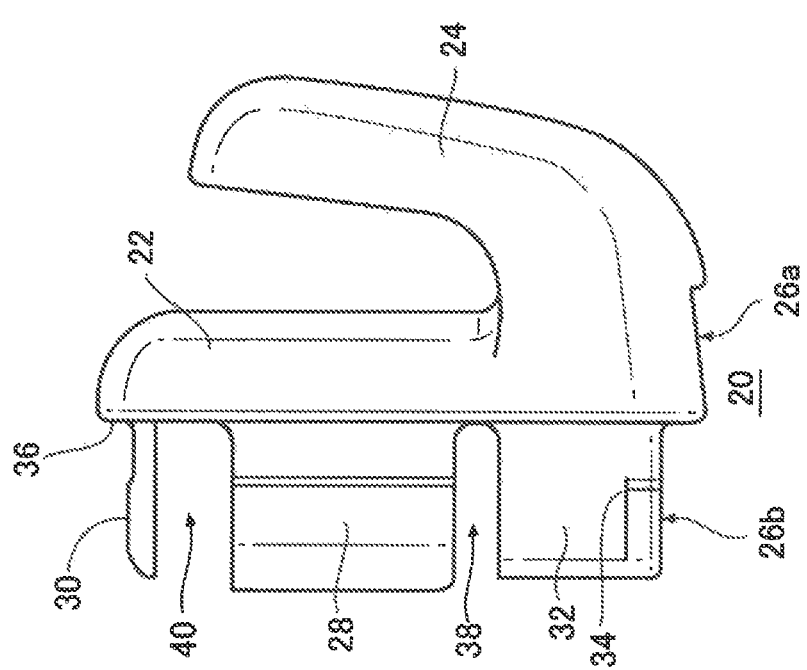

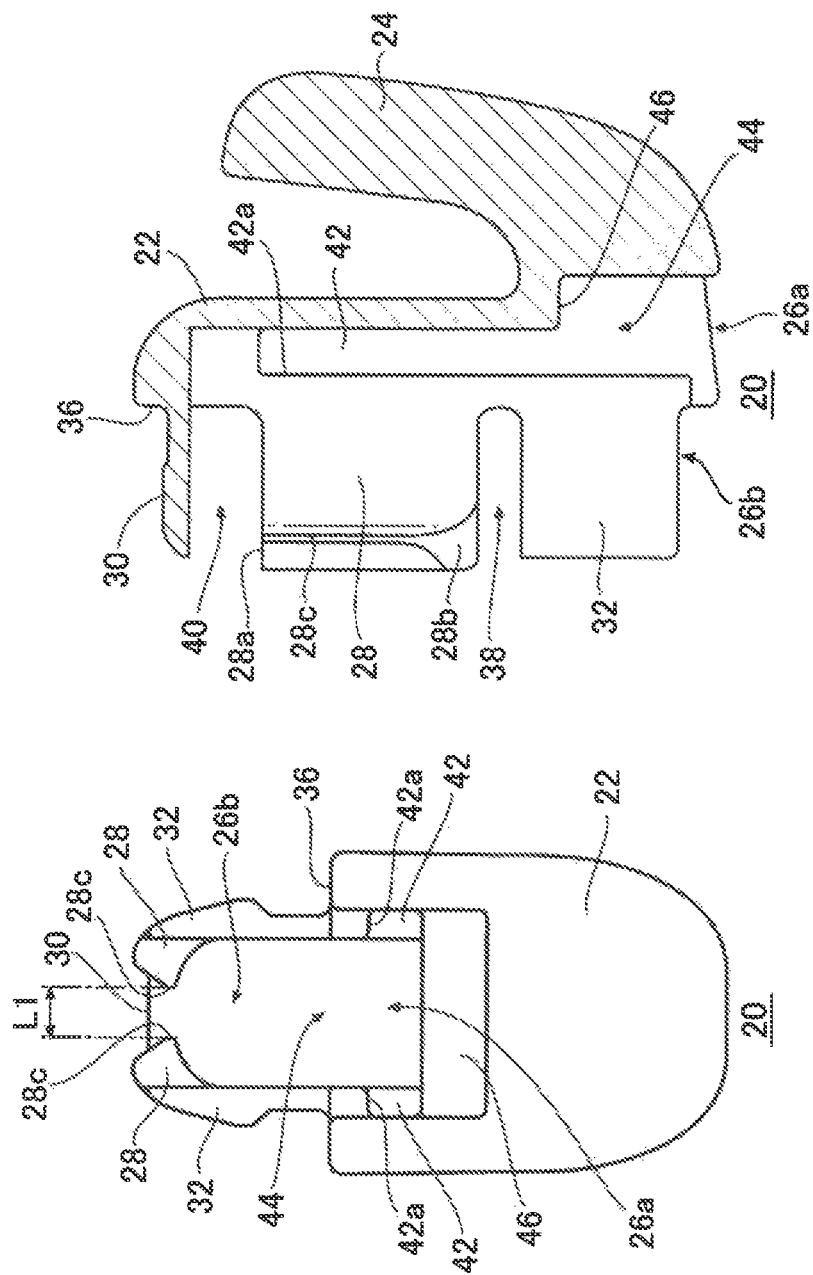

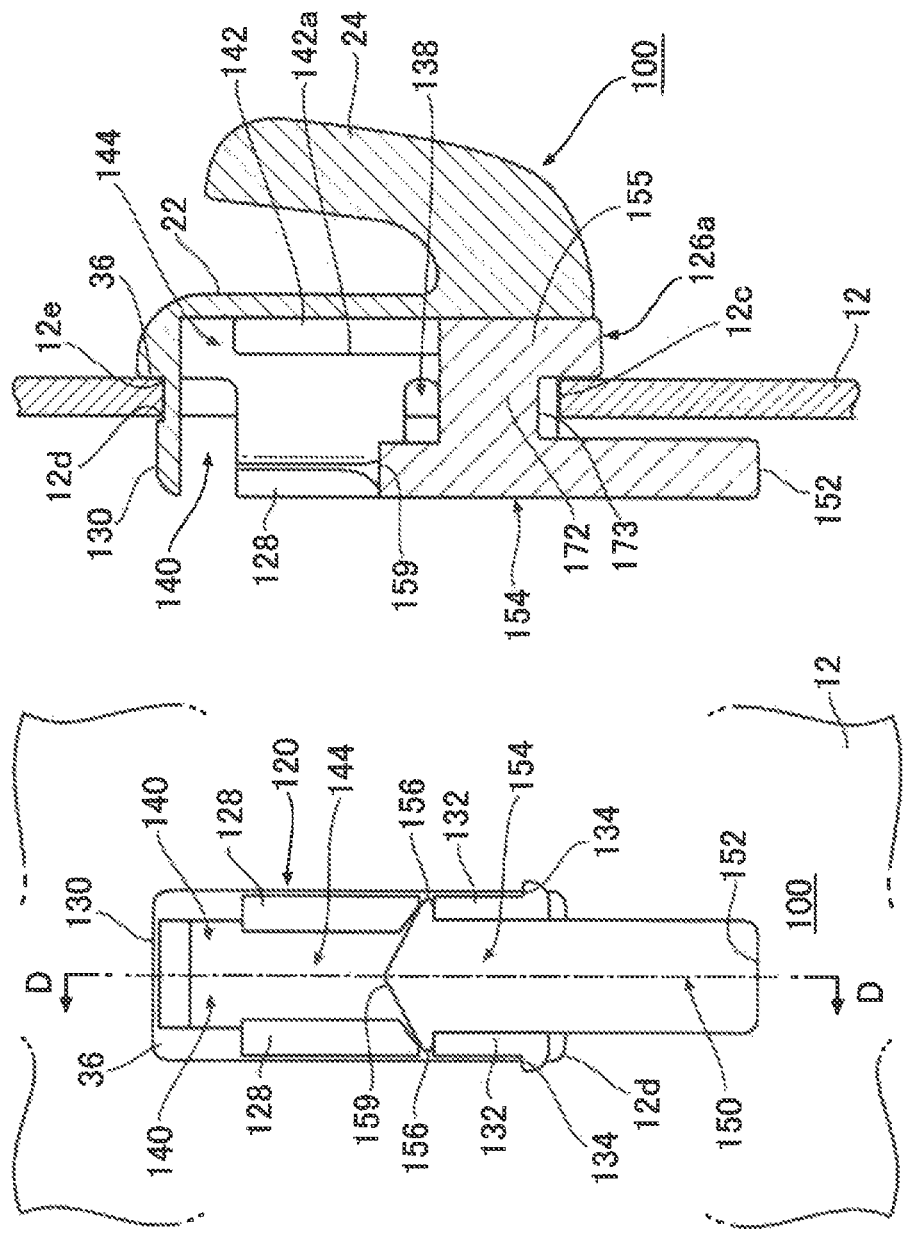

COMPONENT MOUNTING STRUCTURE

TECHNICAL FIELD

The present invention relates to component mounting structures for mounting a component on a mount-base member of a vehicle.

BACKGROUND ART

A hook device for hooking a baggage is provided on an interior wall surface inside a car room. Patent Document 1 discloses a hanger mounting structure including a hook portion. The hanger mounting structure includes a female member including plural engagement leg pieces that hang from a flange portion, and a male member including a shaft portion on the back side of a hook. The engagement leg pieces of the female member are inserted into a mounting hole, and the shaft portion of the male member is pushed into a central hole of the female member, whereby the plural engagement leg pieces are expanded to latch onto the back rim of the mounting hole.

CITATION LIST

Patent Literature

Document 1 JP-UM-1992-074150-A

SUMMARY OF THE INVENTION

Problem that the Invention is to Solve

In the hanger mounting structure disclosed in Patent Document 1, attachment is made by pushing in the shaft portion of the male member in the normal direction of the mounting hole. Thus, along the push-in direction, the shaft portion protrudes out of the back side of the mounting hole.

The present invention is made in view of the above problem, and an object of the present invention is to provide, in a mounting structure for mounting a component on a mount-base member, a technique for reducing a protruding amount of the component protruding to the back side of the mount-base member.

Means for Solving the Problem

To solve the above-described problem, an aspect of the present invention provides a component mounting structure, including:

a component to be mounted on a mount-base member of a vehicle; and a mounting-subject member arranged to make the component latch onto a mounting hole of the mount-base member, wherein the component includes:

a base portion that is out on a front side of the mount-base member;

a latching portion arranged to latch onto a back rim of the mounting hole in a fully-mounted state; and a receiving portion arranged to receive the mounting-subject member, wherein the mounting-subject member includes:

a manipulating portion arranged to be manipulated to mount the component on the mount-base member; and an engagement portion arranged to be engageable with the latching portion on a back side of the mount-base member, and wherein, by manipulating the manipulating portion, the mounting-subject member slides substantially parallel to one of a front surface and a back surface of the mounting hole, thereby causing the engagement portion to be engaged with the latching portion and bringing the component and the mounting-subject member into the fully-mounted state.

Advantageous Effects of Invention

With the present invention, in a mounting structure for mounting a component on a mount-base member, a technique for reducing a protruding amount of the component protruding to the back side of the mount-base member can be provided.

BRIEF DESCRIPTION OF DRAWINGS

FIGS. 3A and 3B are views for illustrating the hook device that is yet to be mounted on the mount-base member.

FIG. 4A is a left side view of a hook member. FIG. 4B is a back view of the hook member.

FIG. 5A is a bottom view of the hook member. FIG. 5B is a cross-sectional view of the hook member taken along the line A-A of FIG. 4B.

FIG. 12A is a back view of a hook device of a modified example and the mount-base member. FIG. 12B is a cross-sectional view of the hook device taken along the line D-D of FIG. 12A in a state where the hook device is inserted into the mounting hole.

MODE FOR CARRYING OUT THE INVENTION

Figure 1A:
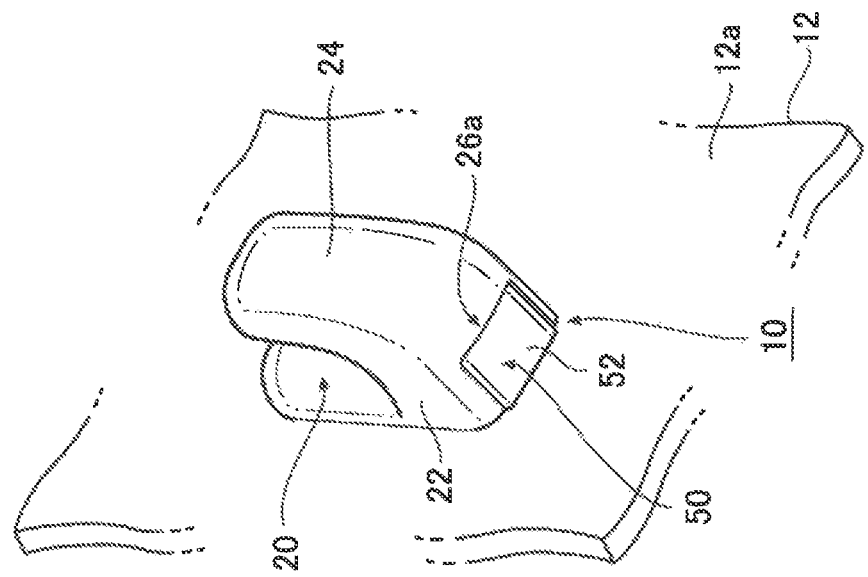
FIGS. 1A and 1B are perspective views of a hook device according to an embodiment as viewed from the front side of a mount-base member in a state where the hook device is mounted on the mount-base member.
Figure 1B:
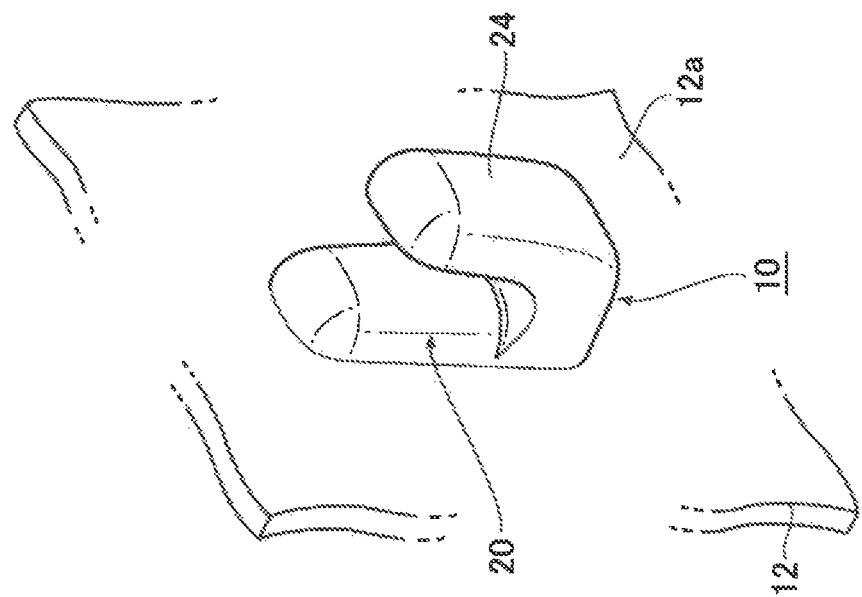
Figure 2:
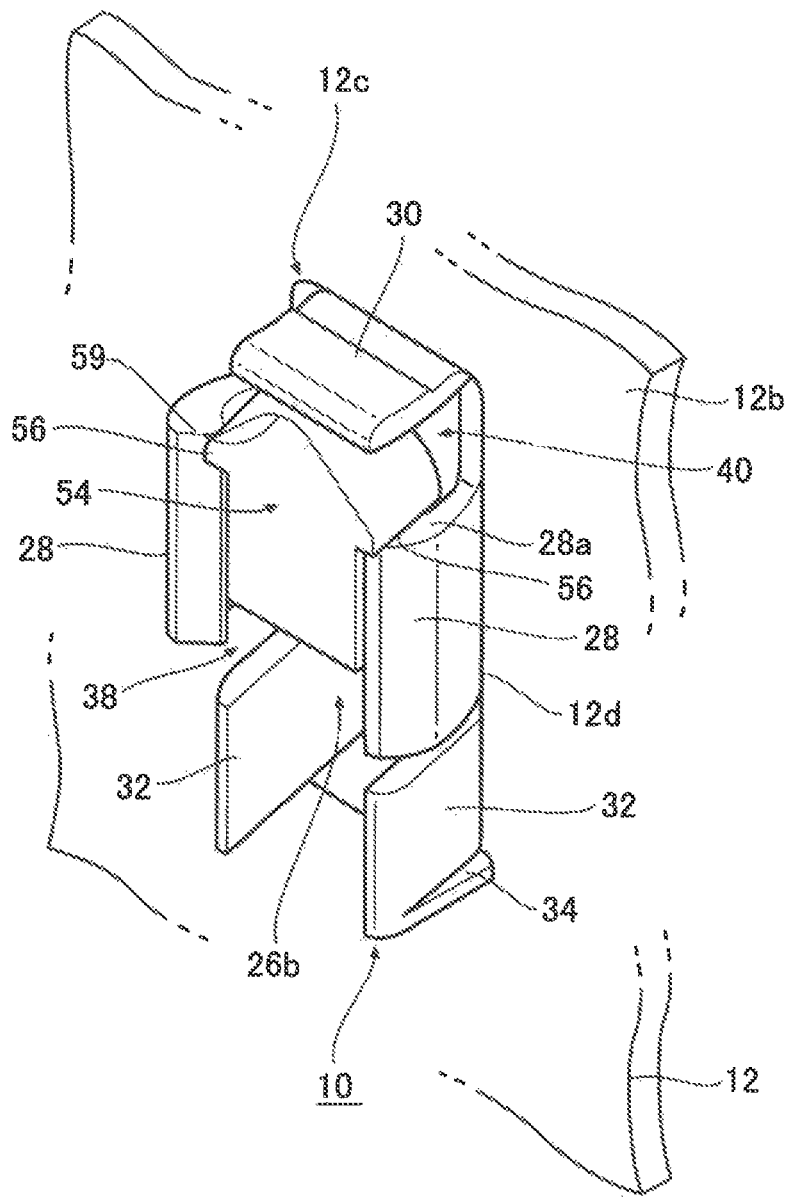
FIG. 2 is a perspective view of the hook device according to the embodiment as viewed from the back side of the mount-base member in a state where the hook device is mounted on the mount-base member.

FIGS. 1A and 1B are perspective views of a hook device 10 according to an embodiment as viewed from the front side of a mount-base member 12 in a state where the hook device 10 is mounted on the mount-base member 12. FIG. 1A is a view of the hook device 10 as viewed from above, and FIG. 1B is a view of the hook device 10 as viewed from below. FIG. 2 is a perspective view of the hook device 10 according to the embodiment as viewed from the back side of the mount-base member 12 in a state where the hook device 10 is mounted on the mount-base member 12. In the present description, same or equivalent constituent elements shown in the drawings are provided with same reference numerals, and repeated descriptions of the same or equivalent constituent elements are omitted as appropriate.

FIG. 1A and FIG. 2 show a fully-mounted state where the hook device 10 has been mounted on a mounting hole 12c of the mount-base member 12. The mount-base member 12 defines a member that constitutes a vehicle interior such as a back surface of the vehicle seat, an interior panel of a luggage floor in a posterior section of a vehicle, and an interior panel of a vehicle ceiling. The mount-base member 12 may be a vehicle body panel, and is not limited to the above-described examples. To be specific, in the embodiment described below, the hook device 10 is mounted on a wall surface extending in a vertical direction, and the upper side of the hook device 10 is referred to as a vertically upper side while the lower side is referred to as a vertically lower side; however, the actual embodiment for mounting the hook device 10 is not limited hereto.

The hook device 10 is mounted so as to be partially embedded in the mounting hole 12c of the mount-base member 12. A hook portion 24 of the hook device 10 is used for hooking a member such as a baggage, a sun visor, and a sunshade.

The hook device 10 includes a hook member 20 including the hook portion 24, and a mounting-subject member 50 arranged to mount the hook member 20 on the mount-base member 12. The mounting-subject member 50 is received from a first receiving portion 26a of the hook member 20 as shown in FIG. 1B. On a back surface 12b of the mount-base member 12 shown in FIG. 2, a pair of expanded first latching portions 28 latch onto a back rim 12d of the mounting hole 12c at the lateral sides while a second latching portion 30 latches onto the back rim 12d at the upper side. The first latching portions 28 and the second latching portion 30 are referred to simply as the "latching portions" when they are not distinguished from each other. The mounting hole 12c has a longitudinally rectangular shape. The mounting hole 12c may have a circular hole shape, or may have another shape.

The latching portions of the hook member 20 are expanded by an engagement portion 54 of the mounting-subject member 50 that gets inside the hook member 20 as shown in FIG. 2. FIG. 2 shows a state where the engagement portion 54 abuts on to expand the first engaging portions 28. However, the present invention is not limited to the present embodiment. As another modification, the engagement portion 54 may be disposed close to the first engaging portions 28 but not abut thereon in the fully-mounted state. That is, the pair of first engaging portions 28 may be configured such that they are expanded wider than the width of the mounting hole 12c so as to be latched onto the back rim 12d of the mounting hole 12c when being inserted into the mounting hole 12c. And, the pair of first engaging portions 28 may be restricted from approaching each other by abutting on the engagement portion 54. As described above, the engagement portion 54 does not necessarily abut on the latching portions in the state of being engaged with the latching portions in the fully-mounted state.

The engagement portion 54 of the mounting-subject member 50 is received from a second receiving portion 26b of the hook member 20. The hook member 20 includes the first receiving portion 26a disposed on the front side of the mount-base member 12, and the second receiving portion 26b disposed on the back side of the mount-base member 12. The first receiving portion 26a and the second receiving portion 26b are referred to simply as the "receiving portions 26" when they are not distinguished from each other.

FIGS. 3A and 3B are views for illustrating the hook device 10 that is yet to be mounted on the mount-base member 12. FIG. 3A is a perspective view of the hook device 10 as viewed from the front side of the mount-base member 12, and FIG. 3B is a perspective view of the hook device 10 as viewed from the back side of the mount-base member 12.

As shown in FIG. 3A, when the hook device 10 is in the before-mounted state, the mounting-subject member 50 is disposed on the lower side, and a manipulating portion 52 thereof is exposed. As shown in FIG. 3B, the hook member 20 includes a pair of holding portions 32 on the lower side of the first latching portions 28. The holding portions 32 hold the engagement portion 54 of the mounting-subject member 50. Third latching portions 34, protruding on the outer surfaces of the holding portions 32 latch onto the back rim 12d of the mounting hole 12c, is functioning as retaining members, in particular, functioning as temporary fixing members for fixing the hook device 10 to the mounting hole 12c in the before-mounted state.

The manipulating portion 52 shown in FIG. 3A is pushed in the first receiving portion 26a to perform mounting. Pushing in the manipulating portion 52 upward slides the mounting-subject member 50 upward, whereby the engagement portion 54 shown in FIG. 3B is moved upward to be engaged with the latching portions as shown in FIG. 2, and thus the mounting is completed. The sliding direction of the mounting-subject member 50 defines a direction approximately parallel to the front surface of the mounting hole 12c, a direction substantially parallel to the front surface 12a of the mount-base member 12, a direction along the front surface 12a around the mounting hole 12c, or a direction perpendicular to the penetrating direction of the mounting hole 12c. Note that the sliding direction of the mounting-subject member 50 is not limited to directions along the mount-base member 12 or the front surface 12a of the mounting hole 12c, and may be substantially parallel along the back surface 12b. The direction perpendicular to the sliding direction of the mounting-subject member 50, that is, the direction perpendicular to the front surface 12a of the mount-base member 12 is referred to as a normal direction. The longitudinal direction of the mounting hole 12c is along the sliding direction of the mounting-subject member 50.

With a mounting structure 1 of the hook device 10, only pushing the manipulating portion 52 from the front side of the mount-base member 12 can perform the mounting, which allows easy mounting work. The mounting can be performed by sliding the mounting-subject member 50 along the front surface 12a of the mount-base member 12, so that a protruding amount of the mounting-subject member 50 protruding to the back side of the mount-base member 12 can be reduced compared with an embodiment where the mounting-subject member is pushed in the normal direction of the front surface 12a. Thus, the space on the back side of the mount-base member 12 can be saved. In addition, in comparison with a case where a pin hole is provided in the normal direction to the base portion 22 of the hook member 20 to insert to make a pin latch onto the pin hole, the latching portions of the hook member 20 can be designed more freely regardless of the shape of the pin hole. To be specific, since the latching portions of the hook member 20 can be formed regardless of the shape of the first receiving portion 26a, the latching portions can be made larger than the outer periphery of the first receiving portion 26a to securely latch onto the rim of the mounting hole 12c. Further, the hook portion 24 can be designed freely regardless of the position of the pin hole provided to the base portion 22, so that it is unnecessary to provide a pin hole to the hook portion 24, or to make the hook portion 24 smaller in order to prevent the pin hole of the base portion 22 and the hook portion 24 from overlapping each other in the front direction, which can suppress reduction in stiffness in the hook portion 24. Detailed descriptions of the configurations of the components of the hook device 10 will be provided with reference to other drawings.

FIG. 4A is a left side view of the hook member 20, and FIG. 4B is a back view of the hook member 20. FIG. 5A is a bottom view of the hook member 20, and FIG. 5B is a cross-sectional view of the hook member 20 taken along the line A-A of FIG. 4B.

The hook member 20 includes the base portion 22 to be exposed on the front side of the mount-base member 12, and the latching portions and the holding portions 32 that protrude from the back side of the base portion 22 as shown in FIG. 4A. The first latching portions 28 and the holding portions 32 are separated from each other via first gaps 38 in the sliding direction of the mounting-subject member 50, and the first latching portions 28 and the second latching portion 30 are separated from each other via second gaps 40 in the sliding direction.

The pair of first latching portions 28 include upper edges 28a, slant portions 28b on the lower end sides, and bulge portions 28c that extend out in the direction of approaching each other on the distal end sides of the first latching portions 28 as shown in FIG. 4B. The pair of slant portions 28b form space to accommodate the distal end portion of the engagement portion 54 of the mounting-subject member 50. The pair of slant portions 28b are inclined so as to approach each other toward the distal end in the sliding direction to allow the pair of first latching portions 28 to be easily expanded when the engagement portion 54 is pushed therein, and thus function as guides to introduce the engagement portion 54.

The third latching portions 34 protruding outward are provided on the lower end sides of the holding portions 32 as shown in FIG. 4B. The inner surfaces of the holding portions 32 have a flat shape while the inner surfaces of the first latching portions 28 have the bulge portions 28c extending out in the facing direction as shown in FIGS. 4B and 5A. The pair of the bulge portions 28c have a smallest distance L1 that is shorter than the width of the engagement portion 54, and thus pushing in the engagement portion 54 in the pair of first latching portions 28 can expand the first latching portions 28. The width of the engagement portion 54 defines the distance between side portions 60 on both the sides of the engagement portion 54. The pair of first latching portions 28 make the second receiving portion 26b have an substantially arch shape in the sliding direction as shown in FIG. 5A. The first latching portions 28 and the holding portions 32 extend out in a wall shape so as to be parallel to the sliding direction from the base portion 22 while the second latching portion 30 extends out in a wall shape so as to be perpendicular to the sliding direction from the base portion 22.

A housing portion 44 for housing the mounting-subject member 50 is provided to the hook member 20 as shown in FIGS. 5A and 5B. A step portion 46 that is perpendicular to the sliding direction is provided in the housing portion 44 as shown in FIG. 5B, and functions as a stopper arranged to stop the mounting-subject member 50 not to be pushed further in the sliding direction.

Guiding portions 42 along the sliding direction of the mounting-subject member 50 are provided in the housing portion 44 as shown in FIG. 5B. The pair of guiding portions 42 are dented in the width direction to have a groove shape as shown in FIG. 5A. The guiding portions 42 are provided along the front surface of the base portion 22. The guiding portions 42 include guiding surfaces 42a that are along a back side edge portion 36 of the base portion 22 and along the front surface of the mounting hole 12c, and prevent the mounting-subject member 50 housed in the housing portion 44 from getting out in the protruding direction of the first latching portions 28, that is, the direction perpendicular to the sliding direction.

Figure 6:
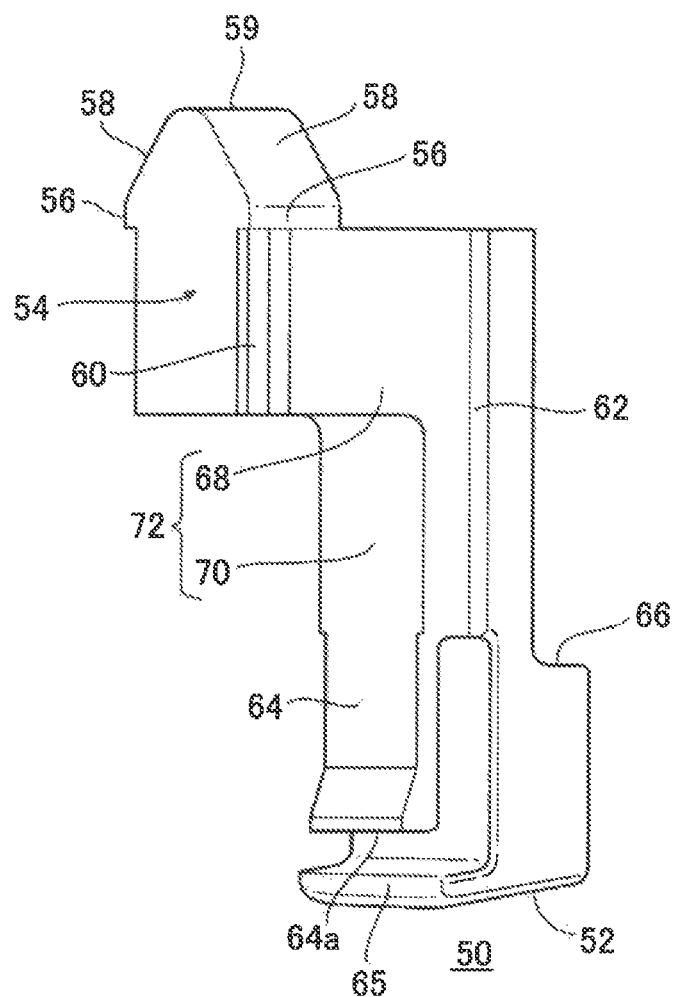
FIG. 6 is a perspective view of the mounting-subject member.
Figure 7:
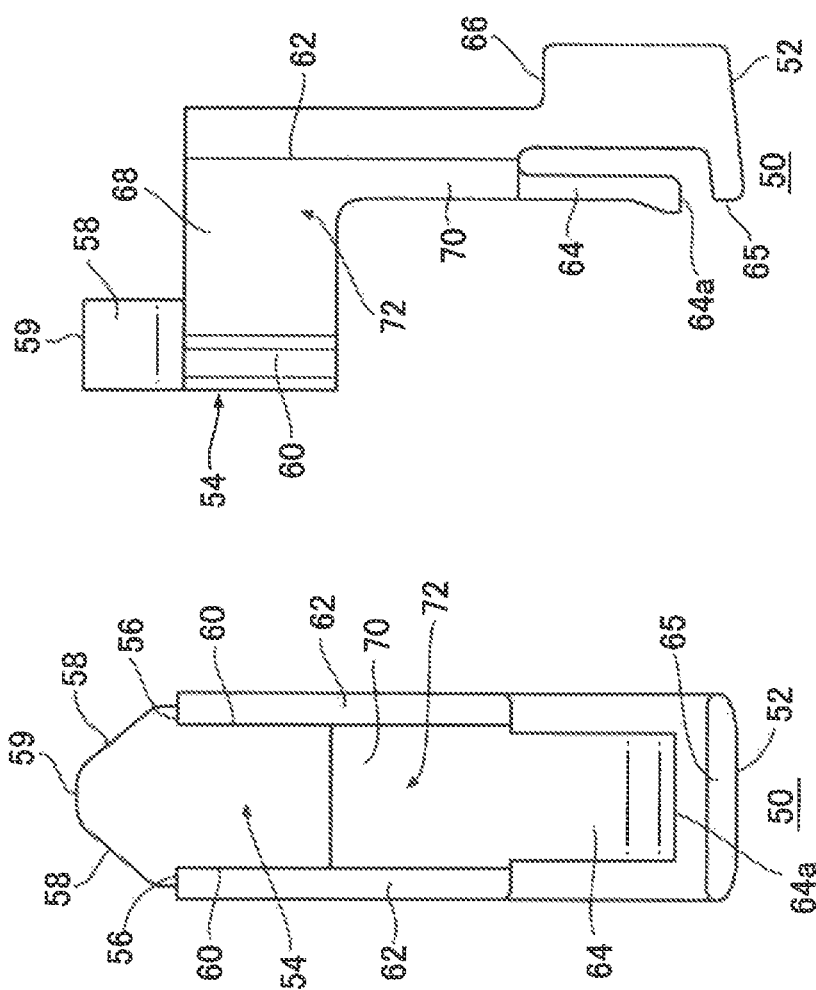
FIG. 7A is a back view of the mounting-subject member.
FIG. 7B is a left side view of the mounting-subject member.

FIG. 6 is a perspective view of the mounting-subject member 50. FIG. 7A is a back view of the mounting-subject member 50, and FIG. 7B is a left side view of the mounting-subject member 50. The mounting-subject member 50 is functioning as latching the hook member 20 onto the mounting hole 12c.

The mounting-subject member 50 includes a manipulating portion 52 which is manipulated on the front side of the mount-base member 12, and the engagement portion 54 engageable with the latching portions of the hook member 20 on the back side of the mount-base member 12, and a connecting portion 72 that connects the manipulating portion 52 with the engagement portion 54.

The connecting portion 72 includes a first connecting portion 68 that deviates the manipulating portion 52 and the engagement portion 54 from each other in the normal direction of the mounting hole 12c, and a second connecting portion 70 that deviates the manipulating portion 52 and the engagement portion 54 from each other in the sliding direction as shown in FIG. 7B.

The second connecting portion 70 is provided with guided portions 62 extending along the sliding direction. The guided portions 62 are formed to extend out in the width direction of the mounting-subject member 50 to enter into the groove-shaped guiding portions 42 of the hook member 20, whereby sliding of the mounting-subject member 50 is guided. An abutting portion 66 that abuts on the step portion 46 of the hook member 20 is provided to the manipulating portion 52 on its opposite side as a surface perpendicular to the sliding direction of the mounting-subject member 50 as shown in FIG. 7A.

An elastic pawl portion 64 shown in FIGS. 6 and 7B extends in the sliding direction from the connecting portion 72 toward the manipulating portion 52, and is flexible in the direction perpendicular to the sliding direction, that is, the normal direction. The elastic pawl portion 64 has its distal end extending out toward the back side, and functions as a restricting portion 64a that abuts on the lower rim of the mounting hole 12c in the fully-mounted state to restrict the hook device 10 from moving in the sliding direction. The restricting portion 64a prevents the mounting-subject member 50 from getting out of the receiving portion 26. Providing the restricting portion 64a to the distal end of the elastic pawl portion 64 that is flexible in the normal direction can suppress the sliding resistance between the restricting portion 64a and the front surface 12a of the mount-base member 12 in sliding the mounting-subject member 50.

A protruding wall portion 65 is provided to the lower end of the mounting-subject member 50 so as to protrude in a wall shape in the substantially normal direction from the manipulating portion 52. Providing the protruding wall portion 65 can increase the area of the manipulating portion 52, whereby the manipulating portion 52 can be easily pushed upward with a finger. In addition, providing the protruding wall portion 65 can cover the elastic pawl portion 64 to prevent a finger from pushing therein. The protruding wall portion 65 abuts on the front surface 12a of the mount-base member 12, which can prevent the hook member 20 from rattling.

The engagement portion 54 includes the side portions 60 formed dented on both the sides, a pair of protruding portions 56 formed expanding in the width direction from the side portions 60, and tapered portions 58 formed tapered toward a distal end portion 59 from the protruding portions 56 at the lateral sides of the engagement portion 54. The side portions 60 and the distal end portion 59 of the engagement portion 54 are engaged with the inner surfaces of the latching portions of the hook member 20.

Figure 8:
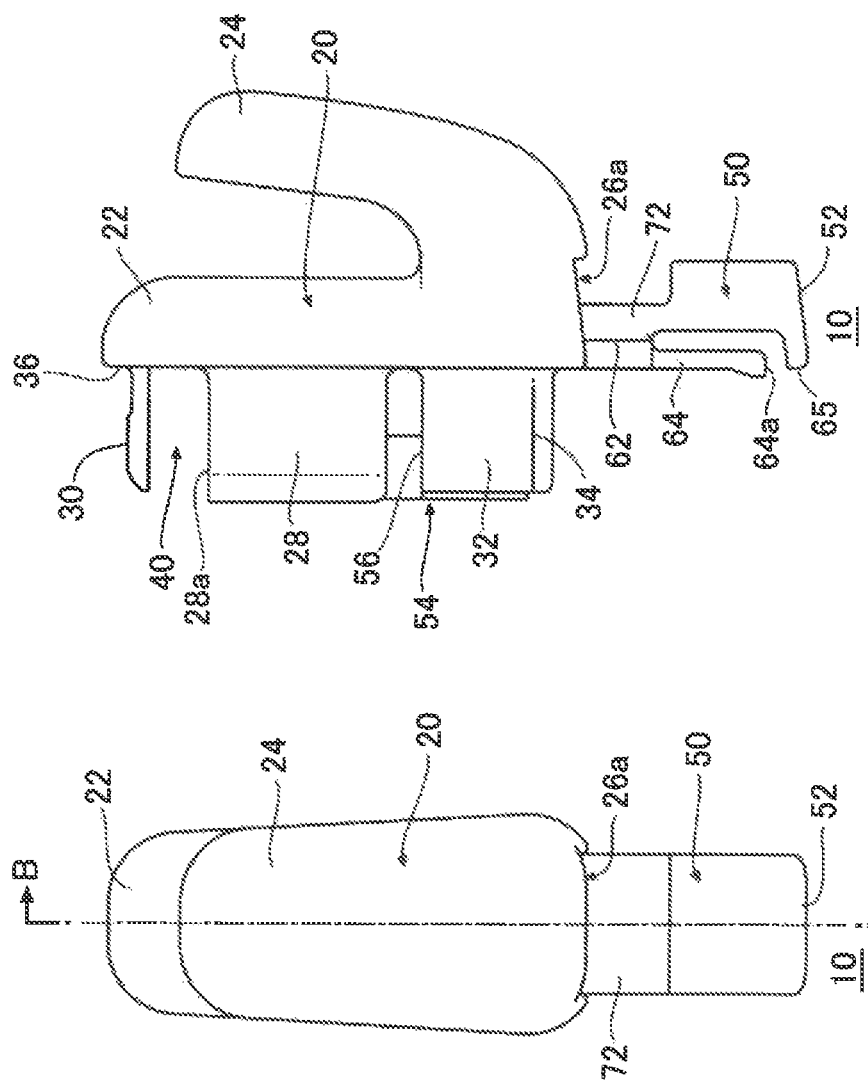
FIG. 8A is a front view of the hook device.
FIG. 8B is a left side view of the hook device.
Figure 9:
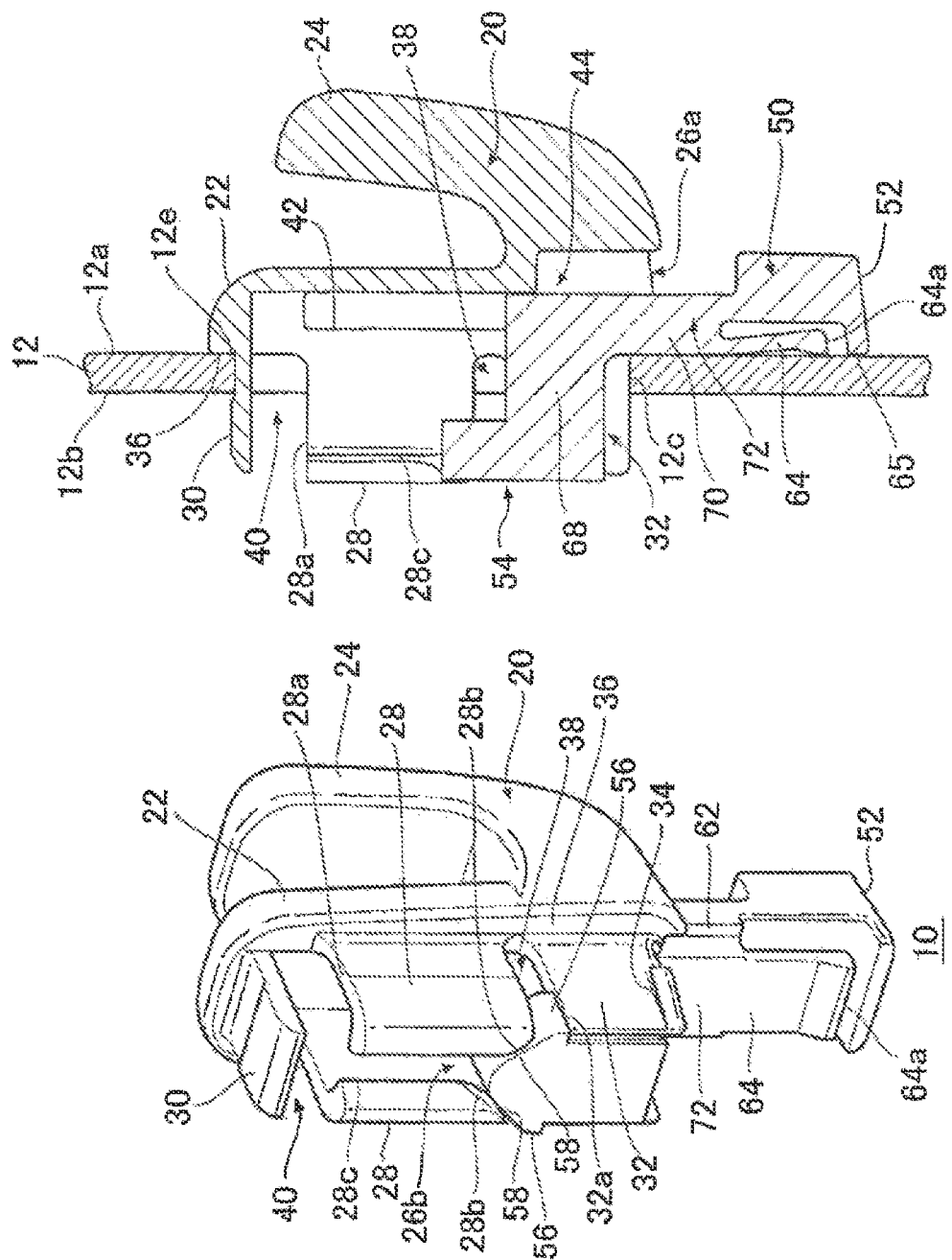
FIG. 9A is a perspective view of the hook device as viewed from the back side.
FIG. 9B is a cross-sectional view of the hook device in the state of being inserted into a mounting hole taken along the line B-B of FIG. 8A.

FIG. 8A is a front view of the hook device 10, and FIG. 8B is a left side view of the hook device 10. FIG. 9A is a perspective view of the hook device 10 as viewed from the back side, and FIG. 9B is a cross-sectional view of the hook device 10 in the state of being inserted into the mounting hole 12c taken along the line B-B of FIG. 8A.

The mounting-subject member 50 is received from the receiving portion 26 of the hook member 20, whereby the hook device 10 is unitized into one as shown in FIGS. 8A and 8B. Unitizing the hook member 20 and the mounting-subject member 50 before mounting can be achieved by the restriction made by the protruding portions 56 and the holding portions 32 and the restriction made by the guiding portions 42 and the guided portions 62.

Figure 11:
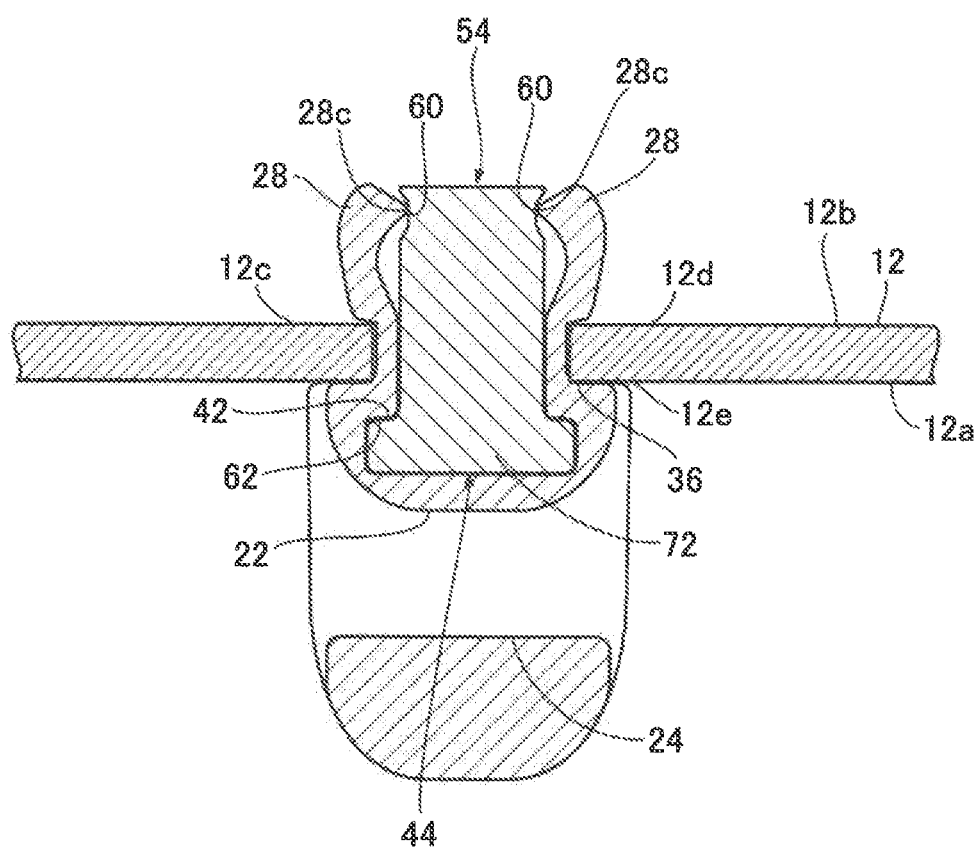
FIG. 11 is a cross-sectional view of the hook device and the mount-base member taken along the line C-C of FIG. 10B.

The protruding portions 56 enter into the first gaps 38 to be held by the holding portions 32 as shown in FIG. 9A. The lower ends of the protruding portions 56 abut on upper ends 32a of the holding portions 32, which restricts movement of the mounting-subject member 50 in the direction of getting out in the sliding direction. In addition, the guided portions 62 are fitted into the guiding portions 42, which restricts movement of the mounting-subject member 50 in the direction perpendicular to the sliding direction. The fitting of the guided portions 62 into the guiding portions 42 is also shown in FIG. 11 to be described below.

Integrating the hook device 10 into one unit can achieve easy insertion of the back side of the hook device 10 into the mounting hole 12c, whereby the hook device 10 can be brought into the temporarily-fixed state with respect to the mounting hole 12c shown in FIG. 9B. When the hook device 10 is inserted into the mounting hole 12c from the distal end sides of the latching portions, the back side edge portion 36 of the hook member 20 abuts on a front rim 12e, thereby being brought into the temporarily-fixed state. The back side edge portion 36 of the base portion 22 functions as a flange that abuts on the front rim 12e of the mounting hole 12c. In the temporarily-fixed state, the third latching portions 34 latch onto the back rim 12d of the mounting hole 12c as shown in FIG. 3B, whereby the hook device 10 is held so as not to easily get out from the mounting hole 12c.

The elastic pawl portion 64 is bent to abut on the front surface 12a, and the restricting portion 64a of the elastic pawl portion 64 is covered to be protected by the protruding wall portion 65 as shown in FIG. 9B. Being bent in the normal direction, the elastic pawl portion 64 can be prevented from making a resistance against the sliding. Pushing in the manipulating portion 52 in the sliding direction from the temporarily-fixed state shown in FIG. 9B toward the first receiving portion 26a of the hook member 20 makes the mounting-subject member 50 guided by the guiding portions 42 to be slid along the front surface 12a of the mount-base member 12.

In order to receive the manipulating portion 52, the first receiving portion 26a is disposed on the lower end side of the base portion 22 of the hook member 20, that is, on the front side of the base portion 22 in the sliding direction. By disposing the first receiving portion 26a on the front side of the mount-base member 12, manipulation to mount the mounting-subject member 50 from the front side of the mount-base member 12 can be performed.

In order to receive the engagement portion 54, the second receiving portion 26b is disposed on the lower end side of the first latching portions 28 of the hook member 20, that is, on the front side of the first latching portions 28 in the sliding direction. By disposing the second receiving portion 26b on the back side of the mount-base member 12, movement of the engagement portion 54 in the sliding direction can be received.

Figure 10:
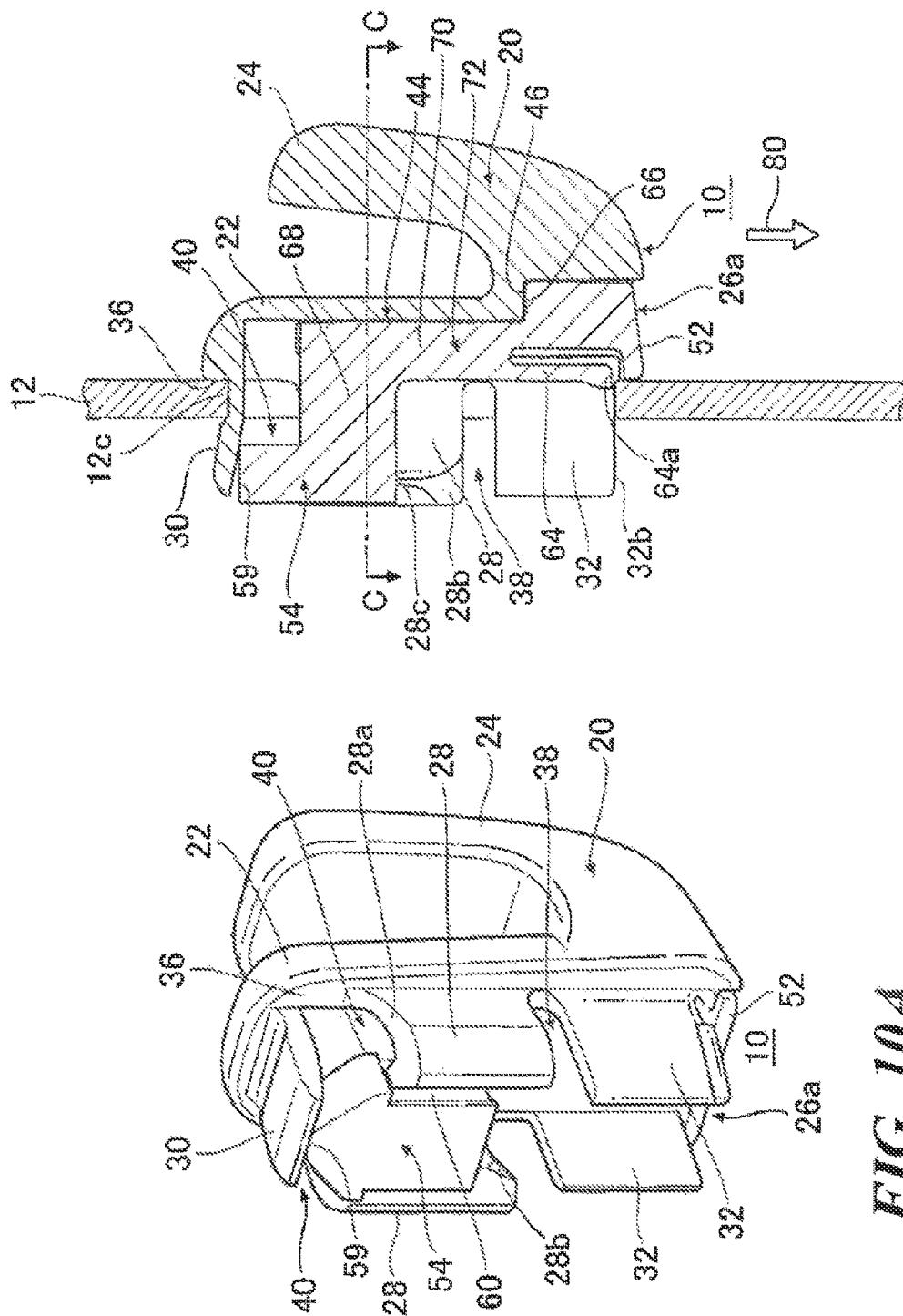
FIG. 10A is a perspective view of the hook device in a state where the mounting-subject member is pushed in the hook device as viewed from the back side.
FIG. 10B is a cross-sectional view of the hook device in the fully-mounted state.

FIG. 10A is a perspective view of the hook device 10 in a state where the mounting-subject member 50 is pushed in the hook device 10 as viewed from the back side, and FIG. 10B is a cross-sectional view of the hook device 10 in the fully-mounted state. It is to be noted that FIG. 10B shows the cross-sectional view taken along the same line in FIG. 9B. FIG. 11 is a cross-sectional view of the hook device 10 and the mount-base member 12 taken along the line C-C of FIG. 10B.

The first latching portions 28 abut on the side portions 60 of the engagement portion 54 to latch onto the back rim 12d of the mounting hole 12c at the lateral sides in the fully-mounted state. This can restrict the lateral movement of the hook device 10 in the sliding direction to prevent rattling.

The bulge portions 28c of the first latching portions 28 abut on the side portions 60 of the engagement portion 54 to expand the pair of first latching portions 28 as shown in FIG. 11. Since the side portions 60 are formed dented, disengagement of the first latching portions 28 and the engagement portion 54 can be prevented, which can enhance the load bearing performance of the hook device 10. Note that the pair of first latching portions 28 may be formed to be expanded in advance, and the engagement portion 54 may restrict the first latching portions 28 from approaching with each other. In either case, the first latching portions 28 are engaged with the engagement portion 54 to latch onto the back rim 12d of the mounting hole 12c.

The protruding portions 56 are held in the second gaps 40 between the first latching portions 28 and the second latching portion 30 in the fully-mounted state as shown in FIG. 10A. Since the protruding portions 56 abut on the upper edges 28a of the first latching portions 28, the mounting-subject member 50 can be prevented from getting out of the hook member 20 in the sliding direction. In addition, the distal end portion 59 of the engagement portion 54 is pushed against the second latching portion 30 to bend the second latching portion 30 upward, whereby the second latching portion 30 can latch more securely onto the distal end portion 59 as shown in FIG. 10B.

The second latching portion 30 abuts on the distal end portion 59 of the engagement portion 54 to latch onto the back rim 12d of the mounting hole 12c at the upper side in the fully-mounted state. This can restrict forward movement of the hook device 10 in the sliding direction to prevent rattling. By receiving the torque of a baggage by the second latching portion 30, the torque being applied when hooking the baggage on the hook portion 24 shown in FIG. 10B, the load bearing performance of the hook device 10 can be enhanced. Note that since the step portion 46 abuts on the abutting portion 66, excessive pressing of the mounting-subject member 50 can be restricted.

The receiving portion 26 receives the mounting-subject member 50 from the direction opposite to a direction 80 in which the load of the baggage hooked on the hook portion 24 is applied. The direction 80 in which the load of the baggage is applied is downward, and the mounting-subject member 50 is received upward in the opposite direction by the receiving portion 26. The restricting portion 64a prevents the mounting-subject member 50 from getting out of the receiving portion. Thus, depending on the load of the baggage hooked on the hook portion 24, a load in the direction same as the loading direction of the baggage is applied also to the hook member 20. However, the mounting-subject member 50 is restricted from moving by the restricting portion 64a, and enters toward the hook member 20 in the direction opposite to the loading direction of the baggage. Thus, the mounting-subject member 50 can be prevented from being disengaged from the receiving portion. In addition, since the second latching portion 30 can latch by being pushed up by the distal end portion 59 of the mounting-subject member 50, the load bearing performance of the hook device 10 can be enhanced. Extending in a wall shape in the width direction, the second latching portion 30 can have a width enough to latch onto the back rim 12d of the mounting hole 12c at the upper side.

The restricting portion 64a abuts on the lower rim of the mounting hole 12c in the fully-mounted state as shown in FIG. 10B, and restricts the movement of the mounting-subject member 50 in the direction of getting out of the receiving portion 26 of the hook member 20. Since the second latching portion 30 and the restricting portion 64a abut on the upper and lower rims of the mounting hole 12c, the movement of the hook device 10 in the up-and-down direction can be restricted. Note that the movement of the hook device 10 in the up-and down direction can be restricted also by the second latching portion 30 and the lower ends 32b of the holding portions 32 as shown in FIG. 10B.

Since the first connecting portion 68 extends in the substantially perpendicular direction to the front surface 12a of the mounting hole 12c while the second connecting portion 70 extends in the substantially parallel direction to the front surface 12a of the mounting hole 12c as shown in FIGS. 9B and 10B, the manipulating portion 52 and the engagement portion 54 can be deviated from each other in the sliding direction and the normal direction of the front surface 12a. Thus, the manipulating portion 52 is exposed on the front side of the mount-base member 12 while the engagement portion 54 is on the back side of the mounting hole 12c as shown in FIG. 9B, which allows the mounting manipulation to be performed from the front side. In addition, manipulation of the manipulating portion 52 can be performed at a position where the manipulating portion 52 gets out to the lower side of the hook member 20 from the first receiving portion 26a. The second connecting portion 70 is disposed along the front surface 12a on the front side of the mount-base member 12 in the state shown in FIG. 9B where the hook device 10 is inserted into the mounting hole 12c.

Figures 13A, 13B:
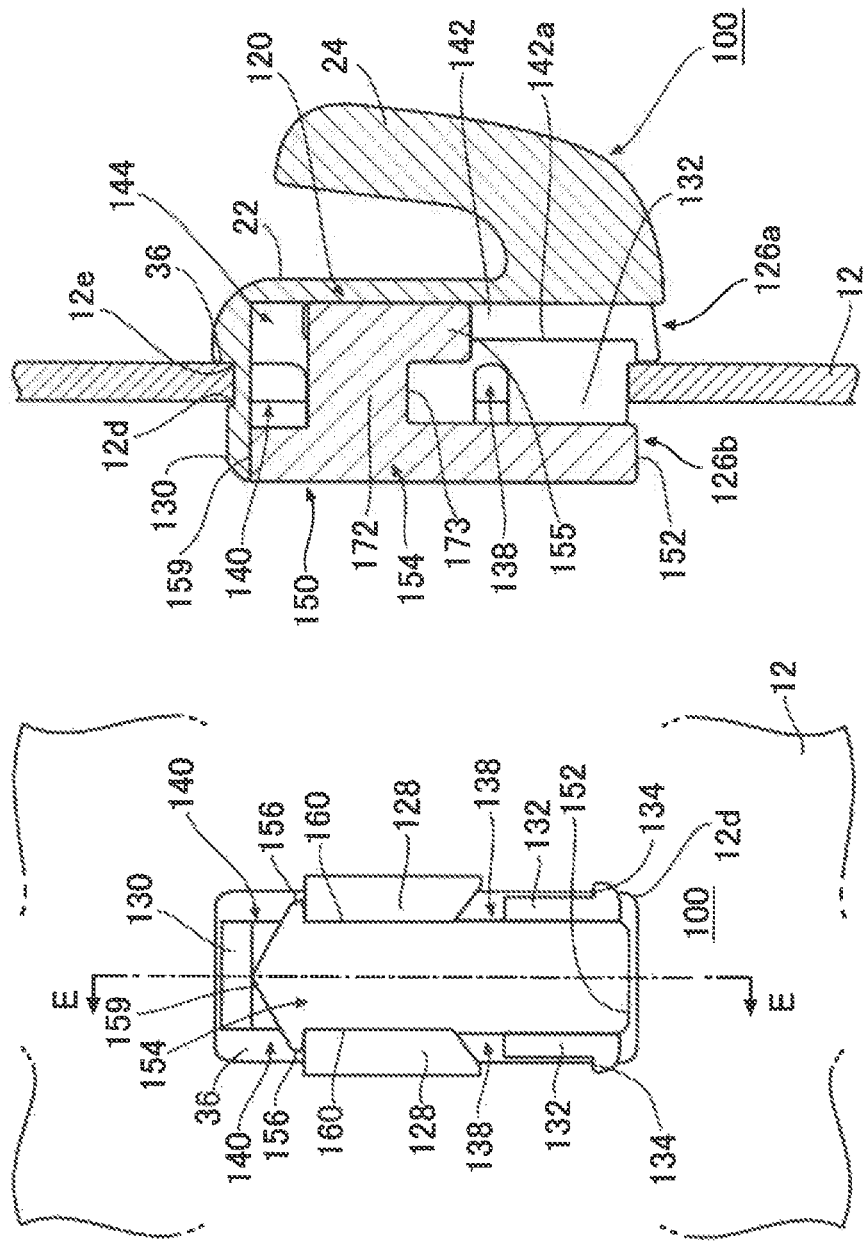
FIG. 13A is a back view of the hook device of the modified example and the mount-base member in a state where a mounting-subject member is pushed in the hook device.
FIG. 13B is a cross-sectional view of the hook device taken along the line E-E of FIG. 13A in the fully-mounted state.

FIG. 12A is a back view of a hook device 100 of a modified example and the mount-base member 12, and FIG. 12B is a cross-sectional view of the hook device 100 taken along the line D-D of FIG. 12A in a state where the hook device 100 is inserted into a mounting hole 12c. FIG. 13A is a back view of the hook device 100 of the modified example and the mount-base member 12 in a state where a mounting-subject member 150 is pushed in the hook device 100, and FIG. 13B is a cross-sectional view of the hook device 100 taken along the line E-E of FIG. 13A in the fully-mounted state.

The hook device 100 of the modified example is, in comparison with the hook device 10 shown in FIG. 9B, common in terms of sliding the mounting-subject member 150 along a surface of the mount-base member 12 while being different in terms of performing the manipulation of the mounting-subject member 150 from the back side of the mount-base member 12.

The hook device 100 includes a hook member 120 and a mounting-subject member 150. The hook member 120 includes a pair of first latching portions 128, a second latching portion 130, a pair of holding portions 132, and third latching portions 134 for temporary fixing provided to the holding portions 132 as constituent elements extending out toward the back side from the base portion 22 as shown in FIG. 12A. The holding portions 132 and the first latching portions 128 are separated from each other in the sliding direction via first gaps 138. The first latching portions 128 and the second latching portions 130 are separated from each other in the sliding direction via second gaps 140.

The mounting-subject member 150 includes a manipulating portion 152 with which manipulation is performed, and an engagement portion 154 engageable with the latching portions of the hook member 120, a front side latching portion 155 to be temporarily fixed to the front rim of the mounting hole 12c, and a connecting portion 172 that connects the engagement portion 154 with the front side latching portion 155 as shown in FIG. 12B.

The engagement portion 154 and the front side latching portion 155 are deviated from each other in the normal direction by the connecting portion 172 to hang from both the sides of the connecting portion 172 in the sliding direction as shown in FIG. 12B.

In unitizing the hook member 120 and the mounting-subject member 150, the front side latching portion 155 is inserted from a first receiving portion 126a while the engagement portion 154 is inserted from a second receiving portion 126b as shown in FIGS. 12B and 13B. Groove-shaped guiding portions 142 are provided in a housing portion 144 to be fitted into guided portions (not illustrated) of the front side latching portion 155 as shown in FIG. 12B. The guiding portions 142 include guiding surfaces 142a along the front surface of the mounting hole 12c to prevent the mounting-subject member 150 housed in the housing portion 144 from getting out in the direction perpendicular to the sliding direction.

The engagement portion 154 is disposed between the pair of holding portions 132 while the manipulating portion 152 is disposed on the lower side of the holding portions 132 as shown in FIG. 12A. The pair of first latching portions 128 are disposed such that an opposed distance between the first latching portions 128 at the distal ends is narrower than that of the pair of holding portions 132. The width of the engagement portion 154, that is, the distance between side portions 160 on both the sides of the engagement portion 154 is larger than the opposed distance between the pair of first latching portions 128 at the distal ends.

The guiding portions 142 guide the mounting-subject member 150 so as to be housed in the housing portion 144, and protruding portions 156 protruding in the width direction of the engagement portion 154 are housed in the first gaps 138 as shown in FIG. 12A, whereby the hook device 100 is unitized. The hook device 100 is inclined to be inserted from the manipulating portion 152 into the mounting hole 12c, and is pushed in so as to pass through the rim of the mounting hole 12c as shown in FIG. 12B. The lower rim of the mounting hole 12c enters into a dent 173 formed by the engagement portion 154, the front side latching portion 155, and the connecting portion 172, and the third latching portions 134 latch onto the back rim 12d of the mounting hole 12c to temporarily fix the hook device 100.

By pushing the manipulating portion 152 of the mounting-subject member 150 upward to slide the mounting-subject member 150 substantially parallel to the back surface 12b of the mount-base member 12 (in the sliding direction), mounting manipulation is performed as shown in FIG. 13A. When the mounting-subject member 150 slides upward, the engagement portion 154 is disposed between the pair of latching portions 128 to expand the pair of latching portions 128. A distal end portion 159 of the engagement portion 154 abuts on the second latching portion 130 to restrict the inward bending of the second latching portion 130. Thus, the first latching portions 128 latch onto the back rim 12d of the mounting hole 12c to bring about a fully-mounted state. Note that the engagement portion 154 does not necessarily abut on the pair of first latching portions 128 in the fully-mounted state as long as the engagement portion 154 restricts the first latching portions 128 from approaching with each other.

In the fully-mounted state, the protruding portions 156 enter into the second gaps 140 as shown in FIG. 13A, and the first latching portions 128 restrict downward sliding of the mounting-subject member 150 while the second latching portion 130 restricts upward sliding of the mounting-subject member 150, which prevents the mounting-subject member 150 from rattling. In addition, the manipulating portion 152 restricts each other's approach of the pair of holding portions 132, so that the third latching portions 134 can latch onto the back rim 12d of the mounting hole 12c to enhance the load bearing performance. Sliding the mounting-subject member 150 substantially parallel to the back surface 12b of the mount-base member 12 on the back side of the mount-base member 12 as described above allows the hook member 120 to be mounted on the mount-base member 12. Thus, a protruding amount of the hook device 100 to the back side of the mount-base member 12 can be reduced. Note that while the third latching portions 134 latch onto the back rim 12d of the mounting hole 12c, the pair of holding portions 132 may be also expanded to latch onto the back rim 12d.

The present invention is not limited to the embodiments described above, and it is also possible to add modifications such as various kinds of design changes to the embodiments based on the knowledge of those skilled in the art. Even embodiments with such modifications will also fall within the scope of the present invention.

For example, while indicated in the embodiments described above is the hook device 10 including the hook portion 24, the present invention is not limited to the embodiments. The hook device 10 may be a buckle in which the base portion 22 includes a belt-like binder for winding to buckle a harness. Alternatively, the base portion 22 may include a bottomed cylindrical drink holder for holding a beverage container. Alternatively, the base portion 22 may include a supporting ring for hanging the handle of an umbrella. As described above, the present invention is not limited to the mounting structure of the hook device 10 according to the embodiments, and can be applied to a component mounting structure for mounting a component on a mount-base member of a vehicle.

While indicated in the embodiment is an embodiment where the first latching portions 28 and the second latching portion 30 are provided as latching portions of the hook member 20, the present invention is not limited thereto. For example, the second latching portion 30 may not be provided. In this case, the upper edges 28a of the first latching portions 28 may be configured to abut on the upper rim of the mounting hole 12c so as to restrict forward movement of the hook member 20 in the sliding direction. Alternatively, the distal end portion 59 of the mounting-subject member 50 may be configured to abut on the upper rim of the mounting hole 12c so as to restrict forward movement of the hook device 10 in the sliding direction.

DESCRIPTION OF REFERENCE NUMERALS AND SIGNS

10 Hook device,
12 Mount-base member,
12a Front surface,
12b Back surface,
12c Mounting hole,
12d Back rim,
12e Front rim,
20 Hook member,
22 Base portion,
24 Hook portion,
26 Receiving portion,
26a First receiving portion,
26b Second receiving portion,
28 First latching portion,
30 Second latching portion,
32 Holding portion,
34 Third latching portion,
36 Back side edge portion,
38 First gap,
40 Second gap,
42 Guiding portion,
44 Housing portion,
46 Step portion,
50 Mounting-subject member,
52 Manipulating portion,
54 Engagement portion,
56 Protruding portion,
58 Tapered portion,
59 Distal end portion,
60 Side portion,
62 Guided portion,
64 Elastic pawl portion,
64a Restricting portion,
65 Protruding wall portion,
66 Abutting portion,
68 First connecting portion,
70 Second connecting portion, and
72 Connecting portion.

INDUSTRIAL APPLICABILITY

The present invention relates to component mounting structures for mounting a component on a mount-base member of a vehicle.

The invention claimed is:
1. A component mounting structure, including:
a component to be mounted on a mount-base member of a vehicle; and a mounting-subject member arranged to make the component latch onto a mounting hole of the mount-base member,
wherein the component includes:
a base portion that is out on a front side of the mount-base member;
at least a pair of latching portions arranged to latch onto a back rim of the mounting hole in a fully-mounted state; and
a receiving portion arranged to receive the mounting-subject member,
wherein the mounting-subject member includes:
a manipulating portion arranged to be manipulated to mount the component on the mount-base member; and
an engagement portion arranged to be engageable with the pair of latching portions on a back side of the mount-base member, and
wherein, by manipulating the manipulating portion, the mounting-subject member slides parallel to one of a front surface and a back surface of a portion of the mount-base member bordering the mounting hole, thereby causing the engagement portion to expand the pair of latching portions or to restrict the pair of latching portions from approaching with each other, and bringing the component and the mounting-subject member into the fully-mounted state.

2. The component mounting structure of claim 1, wherein the mounting-subject member includes:
a connecting portion that connects the manipulating portion with the engagement portion, and
wherein the connecting portion includes:
a first connecting portion extending in a direction perpendicular to the front surface of a portion of the mount-base member bordering the mounting hole; and
a second connecting portion extending in a direction parallel to the front surface of the portion of the mount-base member bordering the mounting hole.

3. The component mounting structure of claim 1, wherein the at least the pair of latching portions includes:
a first latching portion arranged to abut on a side portion of the engagement portion to latch onto the back rim of the mounting hole in the fully-mounted state; and
a second latching portion arranged to abut on a distal end portion of the engagement portion to latch onto the back rim of the mounting hole in the fully-mounted state.

4. The component mounting structure of claim 3, wherein the component further includes:
a holding portion that is separated from the first latching portion in a sliding direction, and
wherein the engagement portion includes:
a protruding portion arranged to enter in between the first latching portion and the holding portion to be held therebetween.

5. The component mounting structure of claim 4, wherein the first latching portion and the second latching portion are separated from each other in the sliding direction, and
wherein the protruding portion is held between the first latching portion and the second latching portion in the fully-mounted state.

6. The component mounting structure of claim 1, wherein the mounting-subject member further includes:
a restricting portion arranged to abut on a rim of the mounting hole to restrict the mounting-subject member from moving in a direction of getting out of the receiving portion in the fully-mounted state.

7. The component mounting structure of claim 1, wherein the base portion includes:
a hook portion for hooking a predetermined member, and
wherein the receiving portion is arranged to receive the mounting-subject member from a direction opposite to a direction of a load to be applied onto the predetermined member.

8. A component mounting structure, including:
a component to be mounted on a mount-base member of a vehicle; and
a mounting-subject member arranged to make the component latch onto a mounting hole of the mount-base member,
wherein the component includes:
base portion that is out on a front side of the mount-base member;
a latching portion arranged to latch onto a back rim of the mounting hole in a fully-mounted state; and
a receiving portion arranged to receive the mounting-subject member,
wherein the mounting-subject member includes:
a manipulating portion arranged to be manipulated to mount the component on the mount-base member; and
an engagement portion arranged to be engageable with the latching portion on a back side of the mount-base member,
wherein the receiving portion includes:
a first receiving portion provided to the base portion; and
a second receiving portion provided to the latching portion, and
wherein, by manipulating the manipulating portion, the mounting-subject member slides parallel to one of a front surface and a back surface of a portion of the mount-base member bordering the mounting hole, thereby causing the engagement portion to be engaged with the latching portion and bringing the component and the mounting-subject member into the fully-mounted state.

9. The component mounting structure of claim 8, wherein the manipulating portion is arranged to be manipulated on the front side of the mount-base member,
wherein the first receiving portion is arranged to receive the manipulating portion, and
wherein the second receiving portion is arranged to receive the engagement portion.

10. A component mounting structure, including:
a component to be mounted on a mount-base member of a vehicle; and
a mounting-subject member arranged to make the component latch onto a mounting hole of the mount-base member,
wherein the component includes:
a base portion that is out on a front side of the mount-base member;
a latching portion arranged to latch onto a back rim of the mounting hole in a fully-mounted state;
a receiving portion arranged to receive the mounting-subject member; and
a guiding portion arranged to guide a sliding movement of the mounting-subject member,
wherein the mounting-subject member includes:

a manipulating portion arranged to be manipulated to mount the component on the mount-base member; and an engagement portion arranged to be engageable with the latching portion on a back side of the mount-base member, wherein, by manipulating the manipulating portion, the mounting-subject member slides in a sliding direction parallel to one of a front surface and a back surface of a portion of the mount-base member bordering the mounting hole, thereby causing the engagement portion to be engaged with the latching portion and bringing the component and the mounting-subject member into the fully-mounted state, and wherein the guiding portion is arranged to restrict the mounting-subject member from moving in a direction perpendicular to all the sliding direction with respect to the component.

\* \* \* \* \*